May 12, 1953
E. K. NICKERSON
2,638,124
VALVE
Filed April 7, 1950
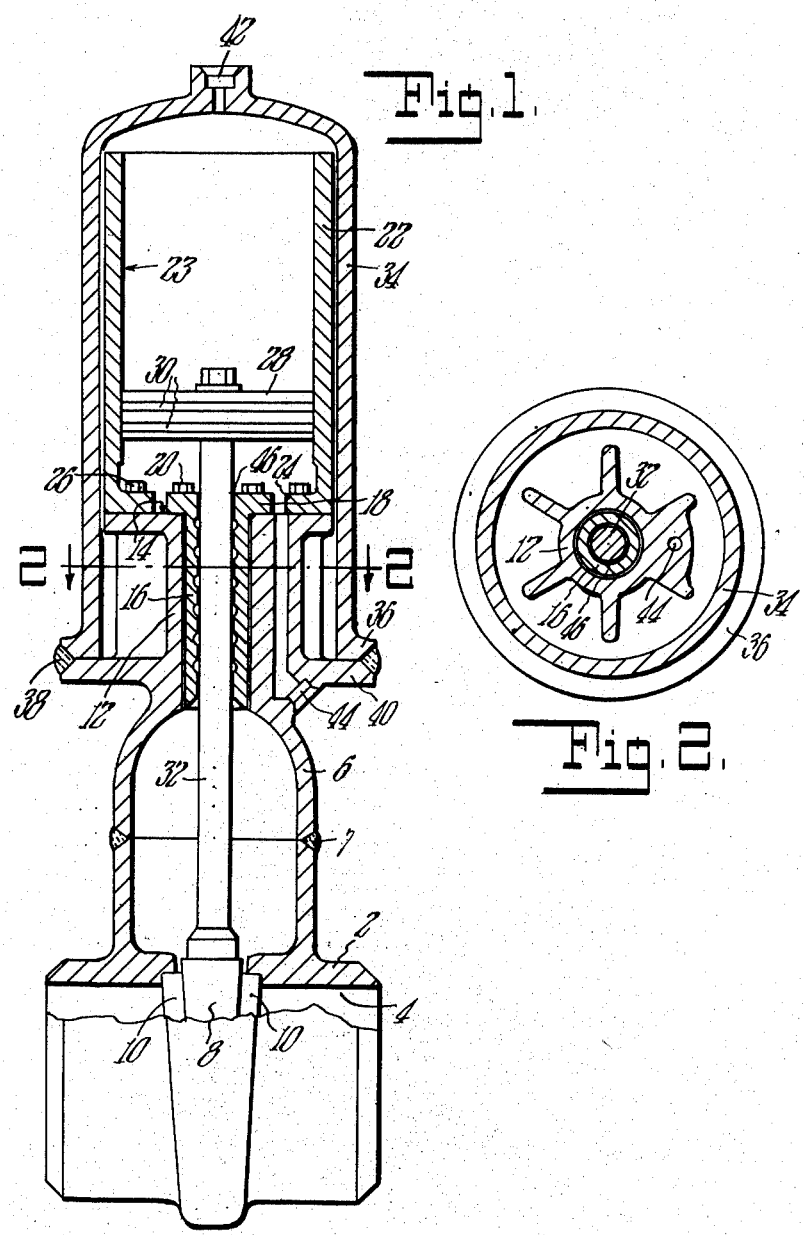
INVENTOR.
Elmer K. Nickerson
BY Ross & Ross Patented May 12, 1953

2,638,124

UNITED STATES PATENT OFFICE 2,638,124

VALVE

Elmer K. Nickerson, Springfield, Mass., assignor to The Chapman Valve Manufacturing Company, Springfield, Mass., a corporation of Massachusetts Application April 7, 1950, Serial No. 154,516

3 Claims. (Cl. 137—689)

This invention relates to improvements in valve manufacture.

The principal objects of the invention are directed to the provision of improvements in valve apparatus wherein the gate or plug of the valve is operated between open and closed positions by means of a pressure actuated piston reciprocable in a cylinder. Such a valve is commonly called a hydraulically operated valve.

According to prior art valves, a body and a bonnet supported cylinder are secured together by bolted flanges and a stem or spindle reciprocates in stuffing boxes for actuating the gate or plug of the valve from the piston in the cylinder.

Under certain conditions of operation as with certain materials and with high pressures and temperatures in the line even very small leaks in the flanged connections and deterioration of the usual material employed in the stuffing box construction cannot be tolerated for safety and other reasons.

According to this invention, a valve structure is provided wherein bolted flanges and stuffing boxes are eliminated. The novel construction is such that alignment of the spindle gland and cylinder bore is maintained and not impaired by heat from welding, brazing, soldering as would be the case were the cylinder welded directly to the bonnet.

The novel features of the invention are applicable whether the piston actuating medium is taken from an outside source or from the medium in the valve which may be of such a nature that yieldable material of the piston rings may not be allowable.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Fig. 1 is a longitudinal sectional elevational view through a valve construction embodying the novel features of the invention; and Fig. 2 is a sectional plan view on the line 2—2 of Fig. 1.

Referring now to the drawings more in detail, the invention will be fully described.

A body structure 2 is provided which has a passageway 4 therethrough and an upper hollow bonnet portion 6.

A gate or plug 8 is movable between a lower closed position between seats 10 usually carried by the body and an upper open position away therefrom in the bonnet.

The bonnet 6 will preferably be formed from upper and lower portions joined by welding at 7, as shown. A neck or yoke portion 12 of the body extends upwardly as a continuation of the bonnet and has an upper flat surface 14.

An elongated hollow gland 16 has an upper flange 18 on the surface 14 and extends downwardly within the portion 12 and is preferably out of contact therewith. Said gland is secured in place on the upper side of the portion 12 as by bolts 20.

A cylinder 22 has a lower flange 24 on the flat surface 14 and is secured thereto by bolts 26. The cylinder is bored at 23 and has a piston 28 reciprocable therein which may be provided with one or more piston rings 30.

If desired, the gland and cylinder may be secured to the upper side of the neck by other means than bolts such as by screw threads. It is desired and necessary, however, that the securing means provide accurate alignment of the bores of the piston and gland.

A piston rod or stem 32 is secured at upper and lower ends to said piston 28 and gate 8 whereby as usual the latter is moved between open and closed positions by reciprocation of the piston in the cylinder.

A closure or shell in the form of an inverted cup 34 closed at its upper end is disposed around the cylinder and its lower end portion preferably extends below the lower end of the cylinder 22.

The lower extremity 36 of the shell is welded at 38 to a portion 40 of the bonnet and yoke so that there is provided an enclosed cylinder construction.

Inlets 42 and 44 for fluid are provided and in these pipes or conduits for connection in a pressure system are welded. By welding connections to the inlets as distinguished from threaded or flanked joints the possibility of leaks is obviated.

The space 46 between the elongated gland 16 and rod 32 is very narrow there being a clearance of but a few thousandths of an inch thereby to permit free reciprocation and reduce the leakage between rod and gland to a minimum, as is necessary.

It is important to maintain the small clearance and to that end the surface 14 is accurately machined at right angles to the longitudinal axis of the rod and the underside of flange 18 of the gland and the longitudinal bore thereof are machined accurately at right angles.

The lower end face of the cylinder and its inner bore 23 are accurately machined at right angles so that with the cylinder supported on the surface 14 the bore thereof is concentric with the longitudinal axis of the rod.

By accurate machining, grinding, or other operations, the bore of the gland and cylinder and the longitudinal axis of the rod are in parallelism. This makes it possible to provide the small clearance between the rod and bore of the gland thereby to hold leakage to a minimum and insures movement of the piston in the cylinder bore without binding.

The point of weld 38 is remote from the contiguous secured together parts to obviate the possibility, during welding, of impairing the desired and necessary accurate relationship of parts.

The opposite ends of the body may be arranged in the usual manner for welding in place in a line.

The component parts of the valve structure may be formed from various metals having those characteristics best adapted for the temperature pressures and materials in the line and they may be subjected to heat treatment if desired and necessary.

The construction is such that the cylinder piston and gland may be machined or ground with the utmost precision and the most accurate relationship will not be disturbed by adjacent parts.

The structure is devoid of flanged connections, jointures, and stuffing box susceptible to leakage and deterioration wherefor the valve is adapted for pressures, temperatures and services beyond the capabilities of prior art valves.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A valve construction comprising in combination, an integral structure including welded together lower body and intermediate hollow bonnet thereabove and elongated upper neck extending upwardly from the bonnet and having a longitudinal bore, said body provided with a passageway therethrough, a gate movable in the body between passageway closing and opening positions, a cylinder bolted at its lower end to the upper side of the neck in alignment with the bore thereof having a piston reciprocable therein, a rod having a lower end secured to said gate and extending upwardly through said bonnet and bore of the neck and connected at its upper end to said piston, an elongated gland around said rod extending downwardly through the bore of the neck and out of contact therewith bolted at its upper end to the upper end of said neck, and an elongated tubular closure surrounding said cylinder and being out of contact therewith provided with a closed upper end above an upper end of the cylinder and having a lower end connected by welding to the structure at a point remote from the upper end of said neck and lower end of said cylinder.

2. A valve construction comprising in combination, an integral structure including welded together lower body and intermediate hollow bonnet thereabove and elongated upper neck extending upwardly from the bonnet and having a longitudinal bore, said body provided with a passageway therethrough, a gate movable in the body between passageway closing and opening positions, a cylinder bolted at its lower end to the upper side of the neck in alignment with the bore thereof having a piston reciprocable therein, a rod having a lower end secured to said gate and extending upwardly through said bonnet and bore of the neck and connected at its upper end to said piston, an elongated gland around said rod extending downwardly through the bore of the neck and out of contact therewith bolted at its upper end to the upper end of said neck, and an elongated tubular closure surrounding said cylinder and being out of contact therewith provided with a closed upper end above an upper end of the cylinder and having a lower end connected by welding to the structure at a point remote from the upper end of said neck and lower end of said cylinder, said point of welding between the structure and closure being spaced below the upper end of the neck and adjacent the jointure of the lower portion of the neck and upper portion of the bonnet.

3. A valve construction comprising in combination, an integral welded together lower body and bonnet extending upwardly from the upper side thereof and an elongated neck extending upwardly from the upper side of the bonnet, said body provided with a passageway therethrough, said bonnet having a chamber for receiving a gate and said neck provided with a longitudinal bore extending upwardly from said chamber, a gate movable in said body and chamber between passageway closing and opening positions, an elongated cylinder bolted at its lower end to the upper side of said neck open at its upper end and being in alignment with the bore of said neck, a piston reciprocable in said cylinder, a rod connected at its lower end to said gate and extending upwardly through the chamber and bore of the neck and connected at its upper end to the piston, an elongated tubular closure surrounding said cylinder provided with a closed upper end above the upper open end of said cylinder and being out of contact with said cylinder and the longitudinal sides of said neck and having a lower end connected by welding to the structure below the upper end of the neck and in a plane adjacent the plane of the jointure of the upper end of the bonnet and lower end of said neck, and an elongated gland around said rod bolted at its upper end to the upper end of said neck and extending downwardly in the bore thereof and being out of contact therewith.

ELMER K. NICKERSON.

References Cited in the file of this patent

UNITED STATES PATENTS

| Number | Name | Date |
| --- | --- | --- |
| 534,360 | Collins | Feb. 19, 1895 |
| 1,642,242 | Gray | Sept. 13, 1927 |
| 1,651,689 | Freeze | Dec. 6, 1927 |
| 1,769,386 | Orton | July 1, 1930 |
| 1,819,043 | Sleeper | Aug. 18, 1931 |
| 1,841,456 | Shand | Jan. 19, 1932 |
| 1,888,392 | Penick | Nov. 22, 1932 |
| 2,054,445 | Plant | Sept. 15, 1936 |
| 2,417,353 | Crane | Mar. 11, 1947 |